United States Patent
Lincoln et al.

(10) Patent No.: US 11,295,594 B2
(45) Date of Patent: Apr. 5, 2022

(54) CHAMBERLESS SMOKE DETECTOR WITH INDOOR AIR QUALITY DETECTION AND MONITORING

(71) Applicant: Carrier Corporation, Palm Beach Gardens, FL (US)

(72) Inventors: David L. Lincoln, Johnston, RI (US); Jennifer M. Alexander, Roseville, MN (US); Peter R. Harris, West Hartford, CT (US); Michael J. Birnkrant, Wethersfield, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/620,731

(22) PCT Filed: Jun. 4, 2018

(86) PCT No.: PCT/US2018/035819
§ 371 (c)(1),
(2) Date: Dec. 9, 2019

(87) PCT Pub. No.: WO2018/226567
PCT Pub. Date: Dec. 13, 2018

(65) Prior Publication Data
US 2020/0193790 A1     Jun. 18, 2020

Related U.S. Application Data

(60) Provisional application No. 62/517,614, filed on Jun. 9, 2017.

(51) Int. Cl.
*G08B 17/107*     (2006.01)
*G01N 21/53*     (2006.01)
*G01N 21/47*     (2006.01)

(52) U.S. Cl.
CPC ......... *G08B 17/107* (2013.01); *G01N 21/532* (2013.01); *G01N 2021/4792* (2013.01)

(58) Field of Classification Search
CPC ..................................................... G01N 15/14
See application file for complete search history.

(56) References Cited

U.S. PATENT DOCUMENTS

| | | | |
|---|---|---|---|
| 3,982,130 A | 9/1976 | Trumble | |
| 5,451,787 A * | 9/1995 | Taylor | G01N 21/39 |
| | | | 250/338.5 |

(Continued)

FOREIGN PATENT DOCUMENTS

| | | |
|---|---|---|
| CN | 104392577 A | 3/2015 |
| DE | 10066246 A1 | 10/2005 |

(Continued)

OTHER PUBLICATIONS

Kaye et al., A dual-wavelength single particle aerosol fluorescence monitor. Oct. 28, 2005; European Symposium on Optics and Photonics for Defence and Security; 2005, Bruges, Belgium (Year: 2005).*

(Continued)

*Primary Examiner* — Nabil H Syed
*Assistant Examiner* — Cal J Eustaquio
(74) *Attorney, Agent, or Firm* — Cantor Colburn LLP (57) ABSTRACT

A method of operating a detection system includes switching the system from a normal mode for sensing smoke to a high sensitivity mode for sensing airborne particles, such that in the high sensitivity mode the detection system is configured to discriminate between particles of diameters less than 2.5 micrometers and 10 micrometers. Transmitting light from one or more light sources of the detection system into a monitored space, and detecting scattered light at one or more light sensing devices of the detection system. The detection (Continued)

of scattered light is indicative of one or more indoor air quality conditions in the monitored space.

14 Claims, 5 Drawing Sheets

(56) References Cited

U.S. PATENT DOCUMENTS

| | | | |
|---|---|---|---|
| 5,477,218 A | 12/1995 | Manmoto et al. | |
| 7,978,087 B2 | 7/2011 | Siber et al. | |
| 8,085,157 B2 | 12/2011 | Luterotti | |
| 8,907,802 B2 | 12/2014 | Erdtmann | |
| 9,739,701 B2 | 8/2017 | Matsunami et al. | |
| 2007/0229824 A1* | 10/2007 | Politze | G08B 17/107 356/336 |
| 2010/0010743 A1 | 1/2010 | Petrovic | |
| 2010/0288921 A1* | 11/2010 | Wang | G01N 15/1459 250/287 |
| 2014/0333928 A1* | 11/2014 | Erdtmann | G08B 17/107 356/338 |
| 2015/0103346 A1* | 4/2015 | Erdtmann | G01N 21/53 356/338 |
| 2015/0371515 A1 | 12/2015 | Zribi et al. | |
| 2016/0260513 A1* | 9/2016 | Pan | H05H 3/04 |
| 2017/0038290 A1* | 2/2017 | Nakai | G01N 15/06 |

FOREIGN PATENT DOCUMENTS

| | | |
|---|---|---|
| DE | 102014200243 A1 | 7/2015 |
| DE | 102014019773 A1 | 6/2016 |
| JP | 2015520380 A | 7/2015 |
| JP | 2017134038 A | 8/2017 |
| WO | 2015179347 A1 | 11/2015 |

OTHER PUBLICATIONS

International Search Report for International Application No. PCT/US2018/035819; International Filing Date Jun. 4, 2018; dated Sep. 24, 2018; 8 Pages.

Written Opinion for International Application No. PCT/US2018/035819; International Filing Date Jun. 4, 2018; dated Sep. 24, 2018;10 Pages.

Z-Wave Alliance, "NodOn® Presents EYE—World's First Smoke Sensor to Take CES Innovation Award", Charlène Mougeot / Carole Da Silva, Accessed Online: Dec. 9, 2019, 4 Pages. URL: https://z-wavealliance.org/5771-2/.

Lang, S., "Multi-criteria Fire Detection", Feb. 2011, 24 Pages. URL: http://osfm.fire.ca.gov/firelifesafety/pdf/Smoke%20Alarm%20Task%20Force/Smoke%20Alarm%20Presentations/Multi-criteria%20Fire%20Detection.pdf.

Chinese Office Action for Chinese Application No. 201880051507.6; dated Mar. 18, 2021; 11 pages.

\* cited by examiner

CHAMBERLESS SMOKE DETECTOR WITH INDOOR AIR QUALITY DETECTION AND MONITORING

CROSS REFERENCE TO RELATED APPLICATIONS

This application is a National Stage application of PCT/US2018/035819, filed Jun. 4, 2018, which claims the benefit of U.S. Provisional Application No. 62/517,614, filed Jun. 9, 2017, both of which are incorporated herein by reference in their entirety.

BACKGROUND

Exemplary embodiments pertain to the art of indoor air quality sensors, smoke sensors, and more particularly to chamberless smoke and indoor air quality sensors.

Smoke sensors, such as commercial smoke sensors, often located inside of a housing or enclosure, use near infrared light, or lights of other wavelengths, scattering inside a small plastic chamber located inside of the enclosure, with inlets of controlled dimensions to prevent entry of unwanted particles. However, some unwanted airborne particles do make their way into the chamber, causing false alarms. Over time, these particles may also collect at the inlets of the sensor chamber, making it more difficult for smoke particles to diffuse into the chamber. Additionally, particles collecting on chamber surfaces may increase sensitivity thereby resulting in more frequent false or nuisance alarms.

To alleviate some of these issues, chamber-less smoke detectors may be used. However, with no chamber there is not a physically well-protected measurement volume, meaning a well-defined operational strategy is key to maintaining measurement integrity. Additionally, the lights used for detection are in some cases nearly constantly on and may provide a nuisance to users, and consumes more power. Therefore, there exists a need for improved chamber-less smoke detection.

Further, it is often desired to monitor indoor air quality of the same space where the smoke sensors are deployed by detecting the presence of PM2.5 and PM10 particles. Typically, however, monitoring indoor air quality requires a stand-alone unit that requires its own power source, via a battery or a wired connection.

BRIEF DESCRIPTION

In one embodiment, a method of operating a detection system includes switching the system from a normal mode for sensing smoke to a high sensitivity mode for sensing airborne particles, such that in the high sensitivity mode the detection system is configured to discriminate between particles of diameters less than 2.5 micrometers and 10 micrometers. Transmitting light from a one or more light sources of the detection system into a monitored space, and detecting scattered light at one or more light sensing devices of the detection system. The detection of scattered light is indicative of one or more indoor air quality conditions in the monitored space.

Additionally or alternatively, in this or other embodiments the one or more indoor air quality conditions includes airborne particles of diameters less than one or more of 2.5 micrometers and 10 micrometers.

Additionally or alternatively, in this or other embodiments the one or more indoor air quality conditions includes airborne particles of diameters less than 2.5 micrometers and/or 10 micrometers.

Additionally or alternatively, in this or other embodiments switching to the high sensitivity mode includes one or more of increasing an on time of the one or more light sources relative to the normal mode, increasing an intensity of the transmitted light relative to the normal mode, and increasing the gain of the detection circuit.

Additionally or alternatively, in this or other embodiments one or more fluorescent airborne particles are excited in the monitored space via light transmitted from the one or more light sources, and light emitted by the one or more fluorescent airborne particles is detected at one or more light sensing devices of the detection system. The presence of a type of airborne particles in the monitored space is determined by the detection of light emitted by the one or more fluorescent airborne particles at the one or more light sensing.

Additionally or alternatively, in this or other embodiments an airborne particle type is discriminated via the use of one or more filters at the one or more light sensing devices.

Additionally or alternatively, in this or other embodiments the one or more filters are one or more polarizing filters.

Additionally or alternatively, in this or other embodiments a particle size of the particulate is discriminated at the detection system, wherein the particle size is indicative of a type of airborne particle.

Additionally or alternatively, in this or other embodiments light is emitted at a first wavelength and an amount of light backscatter at the first wavelength is detected at the smoke detector, and light is emitted at a second wavelength and an amount of light backscatter at the second wavelength is detected at the smoke detector. A particulate particle size is determined via a ratio of the amount of light backscatter at the first wavelength to the amount of light backscatter at the second wavelength.

Additionally or alternatively, in this or other embodiments the first wavelength is in one of the UV spectrum or the visible spectrum, and the second wavelength is in one of the visible spectrum or the IR spectrum.

Additionally or alternatively, in this or other embodiments a first amount of light scattered is detected at a first light sensing device of the smoke detector and a second amount of light scattered is detected at a second light sensing device of the smoke detector. A particulate particle size is determined via ratio of the first amount of light to the second amount of light.

Additionally or alternatively, in this or other embodiments the one or more light sources includes a visible light source or an ultraviolet light source.

Additionally or alternatively, in this or other embodiments the one or more light sources includes an LED, UVLED, or laser diode.

Additionally or alternatively, in this or other embodiments a sensed ambient light level is compensated for.

In another embodiment, a method of operating a detection system includes transmitting light from one or more light sources of the detection system into a monitored space, receiving a scattered light signal at one or more light sensing devices at the detection system, wherein the scattered light signal is received from an obstruction in the monitored space. A presence of a target gaseous species is determined via a decrease in an amount of scattered light received at a selected wavelength.

Additionally or alternatively, in this or other embodiments the detected gaseous species are discriminated via absorption spectroscopy at the smoke detector.

Additionally or alternatively, in this or other embodiments the one or more light sources includes a visible light source or an infrared light source.

Additionally or alternatively, in this or other embodiments the gaseous species is one of CO, radon, or $H_2S$.

In yet another embodiment, an indoor air quality monitor includes one or more light sources configured to emit light into a monitored space, one or more light sensing devices configured to receive scattered light emitted from the one or more light sources, and a processor configured to evaluate the received scattered light signals for the presence of one or more indoor air quality conditions in the monitored space. The one or more indoor air quality conditions includes airborne particles of diameters less than 2.5 micrometers and/or 10 micrometers.

Additionally or alternatively, in this or other embodiments the indoor air quality monitor is configured to operate in a high sensitivity mode for the monitoring of indoor air quality conditions including airborne particles of diameters less than 2.5 micrometers and/or 10 micrometers, and is switchable to a relatively low sensitivity normal mode for the detection of smoke.

Additionally or alternatively, in this or other embodiments when compared to the normal mode, the high sensitivity mode includes one or more of an increased on time of the one or more light sources relative to the normal mode, an increased intensity of the transmitted light relative to the normal mode, and an increased gain of the detection circuit relative to the normal mode.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
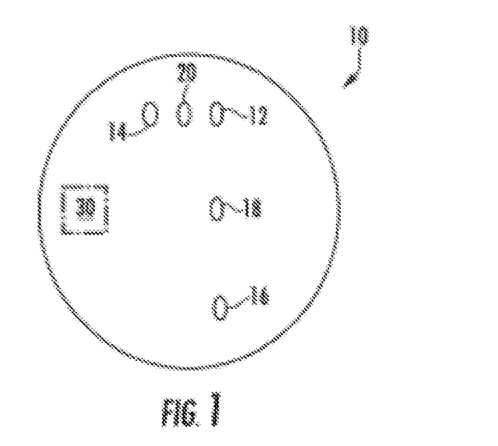
FIG. 1 illustrates a schematic diagram of a smoke detector according to one embodiment of the present disclosure.

FIG. 1 illustrates an exemplary embodiment of a smoke detector, generally indicated at 10. The smoke detector 10 includes a plurality of light sources and a plurality of light sensing devices. In an embodiment, the plurality of light sources includes a first light source 12 and a second light source 14. The first light source 12 and the second light source 14 may include a light emitting diode (LED). The first light source 12 and the second light source 14 may emit light at one or more wavelengths into a space, hereinafter referred to as a "monitored space", which may be a building, a room, or a part of a room into which the light is emitted. In an embodiment, the first light source 12 may emit light of wavelengths characteristic of infrared light, and the second light source 14 may emit light of wavelengths characteristic of blue visible light. The infrared light may be used in the detection and false alarm discrimination of smoke, and the blue visible light may be used in the false alarm discrimination of smoke. Additionally, in some embodiments, a combination of infrared light and visible light may be utilized to determine the size of particles at or near the detector 10.

In an embodiment, the plurality of light sensing devices includes a first light sensing device 16, a second light sensing device 18, and a third light sensing device 20 located within different regions of the smoke detector 10 with a line of sight of the light emitted from the first light source 12 and the second light source 14. The overlap of the field of view of the first light sensing device 16, second light sensing device 18, and third light sensing device 20 with the emissions of the first light source 12 and the second light source 14 form different overlapping sensing volumes. The plurality of light sensing devices are configured to measure signals from the first light source 12 and the second light source 14.

Figure 2:
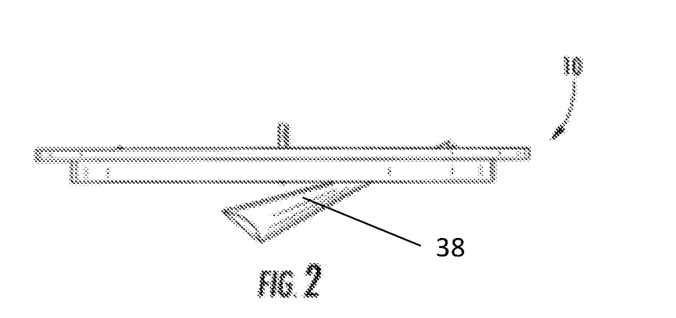
FIG. 2 illustrates a side view of the smoke detector forming a first sensing volume according to one embodiment of the present disclosure.

In an embodiment, the first light sensing device 16, second light sensing device 18, and third light sensing device 20 includes photodiodes. The light sensing device is not limited to photodiodes and could include light sensing devices such as Avalanche PhotoDiodes (APDs), Multi-Pixel Photon Counters (MPPCs), and other photodetectors. For example, the first light sensing device 16 may be used to define a forward-scatter sensing detection volume 38 (shown in FIG. 2) formed by the overlap of the emission from the first light source 12 and the second light source 14 having a first angle of coincidence. In the embodiment shown in FIG. 2, the first angle of coincidence is approximately 130 degrees with the first light sensing device 16. It will be appreciated that other values or angles may be used in some embodiments. The angle of coincidence may be defined as the angle between the symmetry axis of the light cone of the first light source 12 and the second light source 14, and the symmetry axis of the acceptance cone of the light sensing device 16, 18, 20, where 180 degrees may be defined where the light source 12, 14 is pointed directly at the light sensing device 16, 18, 20. It will be appreciated that the scattering angle of light may be calculated by subtracting the angle of coincidence from 180 degrees.

Figure 3:
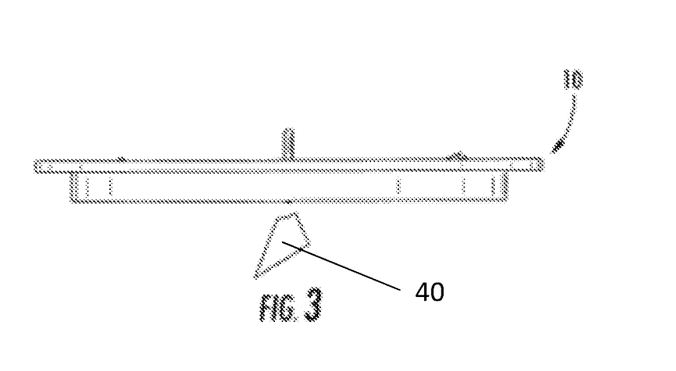
FIG. 3 illustrates a side view of the smoke detector forming a second sensing volume according to one embodiment of the present disclosure.

Referring now to FIG. 3, the second light sensing device 18 may be used to define a first back-scatter sensing detection volume 40 formed by the overlap of the emission from of the first light source 12 and the second light source 14 having a second angle of coincidence with second light sensing device 18. In the embodiment shown in FIG. 3, the second angle of coincidence is approximately 65 degrees. It will be appreciated that other values or angles may be used in some embodiments.

Figure 4:
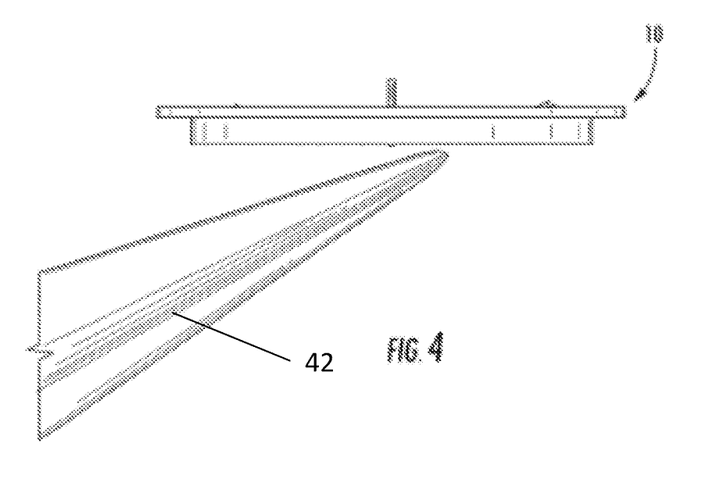
FIG. 4 illustrates a side view of the smoke detector forming a third sensing volume with a light of one wavelength according to one embodiment of the present disclosure.
Figure 5:
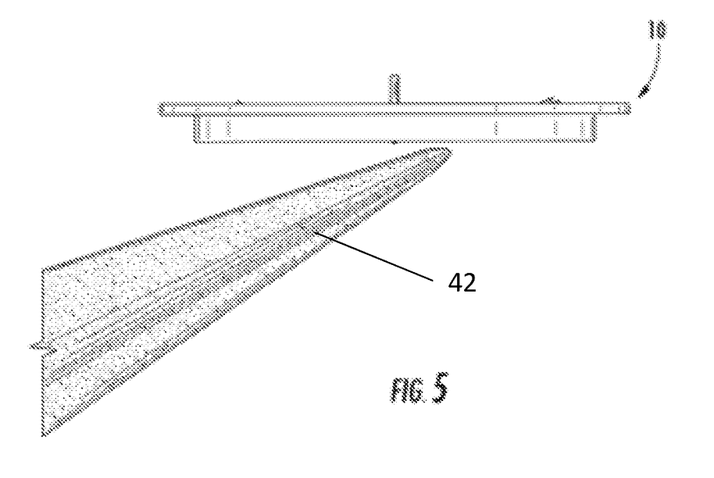
FIG. 5 illustrates a side view of the smoke detector forming a fourth sensing volume with a light of another wavelength according to one embodiment of the present disclosure.

The third light sensing device 20 may be used to define a second back-scatter sensing detection volume 42 (shown in FIGS. 4 and 5) formed by the overlap of the emission from the first light source 12 and the second light source 14 having a third angle of coincidence with the third light sensing device 20. In the embodiments shown, the third angle of coincidence is approximately 0 degrees.

The smoke detector 10 further includes a processing device 30 in electrical communication with the plurality of light sources and the plurality of sensors. The processing device 30 includes a memory (not shown) capable of storing executable instructions. The executable instructions may be stored or organized in any manner and at any level of abstraction, such as in connection with one or more applications, processes or routines to analyze the signals detected by the plurality of sensors to make alarm decisions after preset threshold levels are reached according to the method described herein.

In some embodiments, the smoke detector 10 is operable in a "normal" mode for detection of smoke, and a "high sensitivity" mode, which may be utilized for the monitoring of indoor air quality of a surrounding space. Monitoring of indoor air quality (IAQ) in the present disclosure relates to detection of dust or other airborne particles in the space referred to as $PM_{2.5}$ particles (those particles having a diameter of 2.5 micrometers or less) and $PM_{10}$ particles (those particles having a diameter of 10 micrometers or less). In such embodiments, the smoke detector 10 includes additional electronics or other components to expand the dynamic range of the smoke detector 10 and improve the detection sensitivity of the smoke detector 10 from the same sensing regions and wavelengths to facilitate operation in the high sensitivity mode. In some embodiments, the additional electronics or other components may include a secondary analog to digital converter (ADC) and a switch to switch between a primary, lower bit ADC, in normal mode to the secondary, higher bit ADC, in high sensitivity mode to change the gain of the detection circuit. Further, in the high sensitivity mode, an optical filter or filters may be utilized to filter out undesired wavelength, such as wavelengths outside of those wavelengths emitted by light sources 12, 14.

One skilled in the art will appreciate, however, that the sensing regions and/or wavelengths may be different for the normal mode and high sensitivity mode. Further, the high sensitivity mode may include amplification of a detection circuit at the processor 30, increased light source 12, 14 on times, and/or increased light source 12, 14 intensity relative to operation in the normal mode. In some embodiments, the operation in high sensitivity mode may include obtaining measurements at, for example, a rate of 1 measurement every 1-10 minutes, versus 1 measurement every 1-2 seconds in normal mode. A threshold on the ratio of scattered light from the first light source 12 at a first wavelength to the scattered light from the second light source 14 at a second wavelength could be set to discriminate particles that are within the PM2.5 range and the PM10 range. The ratios of the forward scatter and backward scatter sensing regions may also provide particle size information as well and could be used to improve particle size determination and accuracy of PM2.5 and PM10 measurements. For example, light may be emitted at a first wavelength from the first light source 12 and an amount of light backscatter at the first wavelength is detected at the smoke detector 10. Light may also be emitted at a second wavelength from the second light source 14 and an amount of light backscatter at the second wavelength is detected at the smoke detector. A ratio of the amount of light backscatter at the first wavelength to the amount of light backscatter at the second wavelength is indicative of a particulate particle size.

Further, in other embodiments, a ratio of scattered light signals detected from multiple angles of coincidence, for example, from two or more of first light sensing device 16, second light sensing device 18, and third light sensing device 20, may be utilized to determine a detected particle size. As stated above, in some embodiments the light sensing devices 16, 18, 20 have differing angles of coincidence, defined at least in part by sensing detection volumes 38, 40, 42. Thus a ratio of a first amount of scattered light detected at the first light sensing device 16 with a first angle of coincidence defined by the first sensing detection volume 38 to a second amount of scattered light detected at the second light sensing device 18 with a second angle of coincidence may be utilized to determine particulate particle size.

Figure 6:
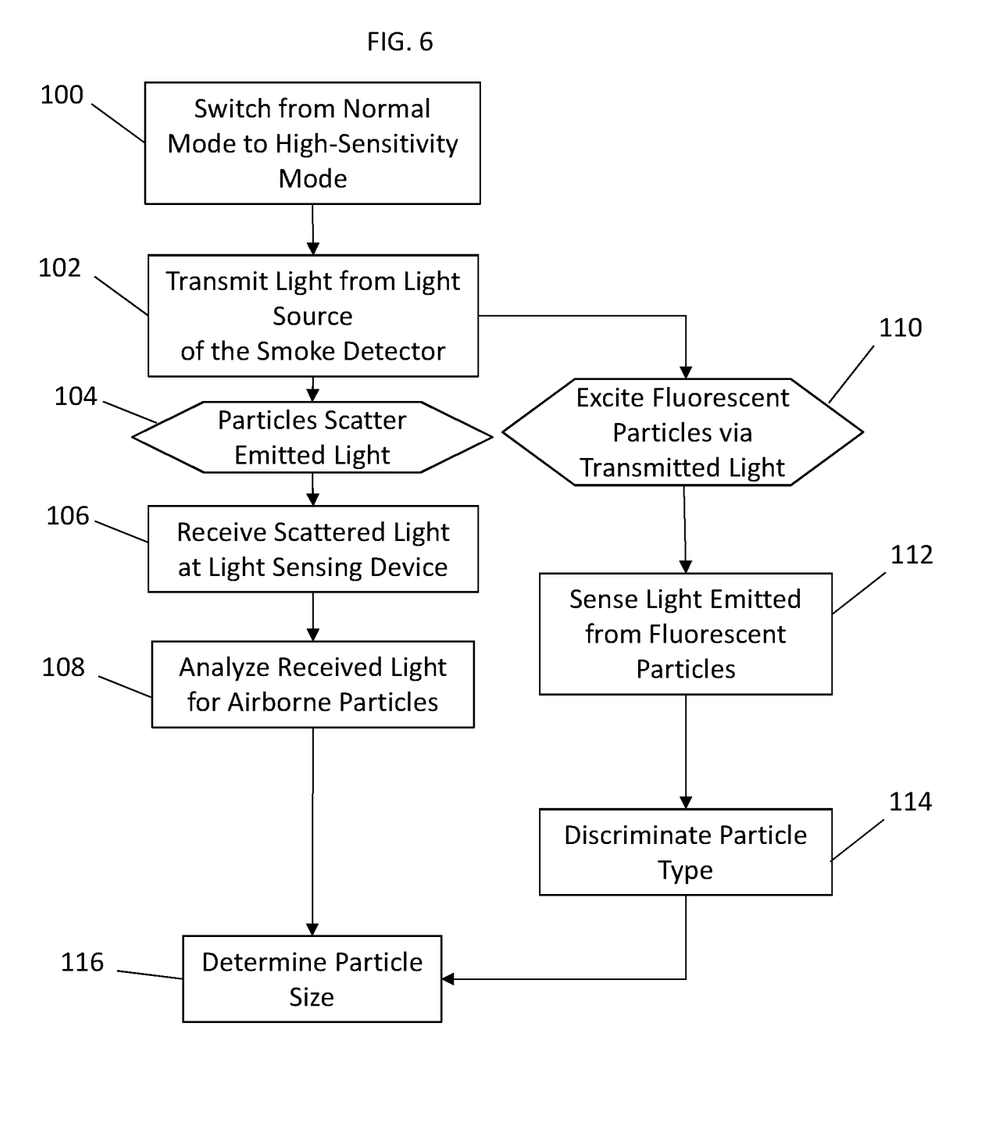
FIG. 6 illustrates a schematic view of a method of operating a smoke detector.

Referring now to FIG. 6, a method of operating the smoke detector 10 to monitor indoor air quality and detection of $PM_{2.5}$ particles (those having a diameter of 2.5 micrometers or less) and detection of $PM_{10}$ (those having a diameter of 10 micrometers or less).

At block 100, the smoke detector 10 is switched from a normal mode, used for smoke detection, to a high-sensitivity mode, used for airborne particle detection. At block 102, light is transmitted from the smoke detector in the UV or blue visible spectrum from, for example, second light source 14 via the LED or UV LED. Additionally, light sources such as a fiber optic emitter or laser diode may be utilized. At block 104, the transmitted light is scattered by any airborne particles in the path of the transmitted light. The scattered light is received at one or more of the light sensing devices 16, 18, 20 of the smoke detector 10 at block 106. At block 108, the processing device 30 is utilized to analyze the scattered light received at the light sensing devices 16, 18, 20 for the presence of the $PM_{2.5}$ and $PM_{10}$ particles.

In some embodiments, at block 110, the transmitted light excites fluorescent particles, such as mold or pollen particles or other microbial contaminants, in the space. At block 112, the one or more of the light sensing devices 16, 18, 20 of the smoke detector 10 are utilized to sense light emitted from the fluorescent particles. The light sensing device 16, 18, 20 may be configured to accept light in only wavelengths longer than those wavelengths emitted by the second light source 14. The longer wavelengths are indicative of the light emitted by the fluorescent particles, and thus indicate the presence of fluorescent particles, such as pollen, in the space. In some embodiments, a filter (not shown) may be utilized at the appropriate light sensing device 16, 18, 20 to configure the light sensing device 16, 18, 20 to accept only the longer than emitted wavelengths.

Further, in some embodiments, in block 114 the type of particles detected in block 112 is discriminated. This may be accomplished, for example, by polarizing the light emitted from the fluorescent particles before being sensed by the light sensing devices 16, 18, 20, with one or more polarizing filters between the fluorescent particles and the light sensing devices 16, 18, 20. To detect particular particles, one or more different polarizing filters may be utilized, with each polarizing filter tuned to allow detection or discrimination of a particular particle or particle type.

In block 116, the first light source 12 and the second light source 14 may be utilized to determine a particle size, by evaluating a ratio of blue light backscatter to IR backscatter sensed by the backscatter light sensing devices 18 and 20.

Figure 7:
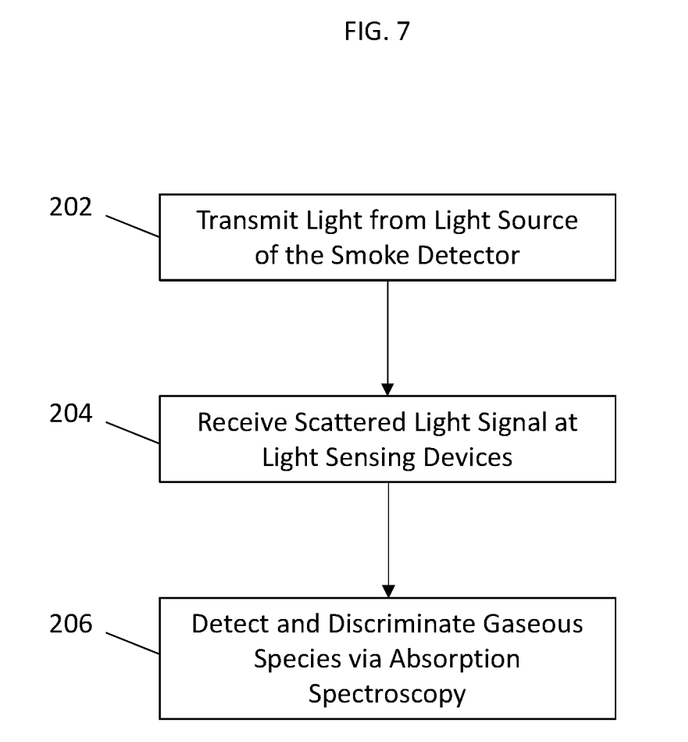
FIG. 7 illustrates a schematic view of another method of operating a smoke detector.

Further, the smoke detector 10 may be utilized to detect or monitor the space for the presence of gaseous species in the space. The target gaseous species may include CO, radon, $H_2S$, VOCs, refrigerants, hydrocarbons or others. Referring to FIG. 7, the light is emitted from the first light source 12 and/or the second light source 14 at block 202 toward, for example, a wall or other obstruction in the space. The one or more light sensing devices 16, 18, 20 receive scattered light at block 204. In particular, back scattered photodiodes 18, 20 may be utilized to detect emitted light that is scattered off the wall or obstruction, and gaseous species are then detected and discriminated at block 206 via absorption spectroscopy of the received scatter light at the processing device 30.

In some embodiments, the smoke detector 10 is configured to detect an ambient light level in the space to improve sensitivity and reliability of detection smoke and for other indoor air quality monitoring and detection.

Figure 8:
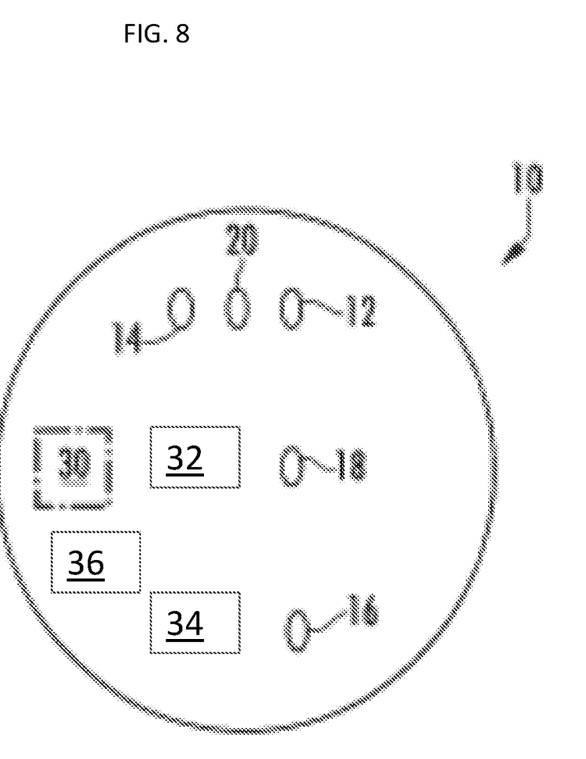
FIG. 8 illustrates a schematic view of another embodiment of a smoke detector.

Referring to FIG. 8, an ambient light monitoring circuit 32 is operably connected to the processing device 30 at the smoke detector 10. The monitoring circuit 32 is connected to one or more of the light receiving devices 16, 18, 20, which may be configured to periodically receive an ambient light signal, which may be evaluated by the monitoring circuit 32. Once light is transmitted by the first light source 12 and/or the second light source 14 for smoke and/or other indoor air quality detection and monitoring, the received light signal may be adjusted at the processing device 30 based on a strength of the ambient light signal received. For example, the received light signal may be amplified by one or more amplifiers 34 connected to the light receiving devices 16, 18, 20. Further, a variable amplification circuit 36 may be utilized to vary an amount of amplification applied by the one or more amplifiers 34, based on the ambient light level sensed by the monitoring circuit 32.

In some embodiments, the monitoring circuit 32 triggers an ambient light level measurement immediately prior to the first light source 12 and the second light source 14 being triggered for detection operations. The ambient light level detected may be then subtracted from the received light signal resulting from the triggering of the first light source 12 and the second light source 14. Further, if the sensed ambient light level is above a threshold at which a useful detection may be made, the first light source 12 and the second light source 14 may not trigger at that time, and the process of measuring the ambient light level may be restarted after a predetermined time delay.

The embodiments disclosed herein allow for the use of the smoke detector 10 to detect and monitor other indoor air quality conditions, such as target gases, particulate contaminants, microbial contaminants or other conditions, in addition to smoke. This eliminates the need for additional, separately powered indoor air quality sensors to be utilized in the same space in which the smoke detector is placed, resulting in substantial consumer and business cost savings.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of operating a detection system, comprising:
   switching the system from a normal mode for sensing smoke to a high sensitivity mode for sensing airborne particles, such that in the high sensitivity mode the detection system is configured to discriminate between particles of diameters less than 2.5 micrometers and 10 micrometers;
   transmitting light from two light sources of the detection system into a monitored space, a first light source of the two light sources transmitting light at a first wavelength and a second light source of the two light sources transmitting light at a second wavelength different from the first wavelength; and
   detecting scattered light at one or more light sensing devices of the detection system;
   wherein the detection of scattered light is indicative of one or more indoor air quality conditions in the monitored space;
   exciting one or more fluorescent airborne particles in the monitored space via light transmitted from the two light sources;
   detecting light emitted by the one or more fluorescent airborne particles at one or more light sensing devices of the detection system; and
   determining the presence of a type of airborne particles in the monitored space via the detection of light emitted by the one or more fluorescent airborne particles at the one or more light sensing devices;
   wherein the first wavelength is in the blue visible spectrum, and the second wavelength is in the IR spectrum; and
   wherein switching to the high sensitivity mode includes one or more of:
     increasing an on time of the two light sources relative to the normal mode; and
     increasing the gain of the detection circuit.

2. The method of claim 1, wherein the one or more indoor air quality conditions includes airborne particles of diameters less than one or more of 2.5 micrometers and 10 micrometers.

3. The method of claim 1, further comprising discriminating an airborne particle type via the use of one or more filters at the one or more light sensing devices.

4. The method of claim 3, wherein the one or more filters are one or more polarizing filters.

5. The method of claim 1, further comprising discriminating a particle size of the particulate at the detection system, wherein the particle size is indicative of a type of airborne particle.

6. The method of claim 5, further comprising:
emitting light at the first wavelength from the first light source and detecting an amount of light backscatter at the first wavelength at the smoke detector;
emitting light at the second wavelength from the second light source and detecting an amount of light backscatter at the second wavelength at the smoke detector; and
determining a particulate particle size via a ratio of the amount of light backscatter at the first wavelength to the amount of light backscatter at the second wavelength.

7. The method of claim 5, further comprising:
detecting a first amount of light scattered at a first light sensing device of the smoke detector;
detecting a second amount of light scattered at a second light sensing device of the smoke detector; and
determining a particulate particle size via a ratio of the first amount of light to the second amount of light.

8. The method of claim 1, wherein the one or more light sources include a visible light source or an ultraviolet light source.

9. The method of claim 8, wherein the one or more light sources include an LED, UVLED, or laser diode.

10. The method of claim 1, further comprising compensating for a sensed ambient light level.

11. A method of operating a detection system, comprising:
switching the system from a normal mode for sensing smoke to a high sensitivity mode for sensing airborne particles;
transmitting light from two light sources of the detection system into a monitored space, a first light source of the two light sources transmitting light at a first wavelength and a second light source of the two light sources transmitting light at a second wavelength different from the first wavelength;
receiving a scattered light signal at one or more light sensing devices at the detection system, wherein the scattered light signal is received from an obstruction in the monitored space; and
determining the presence of a target gaseous species via a decrease in an amount of scattered light received at a selected wavelength;
exciting one or more fluorescent airborne particles in the monitored space via light transmitted from the two light sources;
detecting light emitted by the one or more fluorescent airborne particles at one or more light sensing devices of the detection system; and
determining the presence of a type of airborne particles in the monitored space via the detection of light emitted by the one or more fluorescent airborne particles at the one or more light sensing devices;
wherein the first wavelength is in the blue visible spectrum, and the second wavelength is in the IR spectrum; and
wherein switching to the high sensitivity mode includes one or more of:
increasing an on time of the two light sources relative to the normal mode; and
increasing the gain of the detection circuit.

12. The method of claim 11, further comprising discriminating the detected gaseous species via absorption spectroscopy at the smoke detector.

13. The method of claim 10, wherein the gaseous species is one of carbon monoxide, radon, or $H_2S$.

14. An indoor air quality monitor, comprising:
two light sources configured to emit light into a monitored space, a first light source of the two light sources transmitting light at a first wavelength and a second light source of the two light sources transmitting light at a second wavelength different from the first wavelength;
one or more light sensing devices configured to receive scattered light emitted from the two light sources; and
a processor configured to evaluate the received scattered light signals for the presence of one or more indoor air quality conditions in the monitored space;
wherein the one or more indoor air quality conditions includes airborne particles of diameters less than 2.5 micrometers and/or 10 micrometers;
wherein the two light sources are configured to excite one or more fluorescent airborne particles in the monitored space via light transmitted from the two light sources;
wherein the one or more light sensing devices are configured to detect light emitted by the one or more fluorescent airborne particles and determine the presence of a type of airborne particles in the monitored space;
wherein the first wavelength is in the blue visible spectrum, and the second wavelength is in the IR spectrum;
wherein the indoor air quality monitor is configured to operate in a high sensitivity mode for the monitoring of indoor air quality conditions including airborne particles of diameters less than 2.5 micrometers and/or 10 micrometers, and is switchable to a relatively low sensitivity normal mode for the detection of smoke; and
wherein switching to the high sensitivity mode includes one or more of:
increasing an on time of the two light sources relative to the normal mode; and
increasing the gain of the detection circuit.

* * * * *